United States Patent
Shindo (12)

(10) Patent No.: US 10,048,072 B2
(45) Date of Patent: Aug. 14, 2018

(54) SENSOR DEVICE, ELECTRONIC APPARATUS, AND MOVING OBJECT

(71) Applicant: Seiko Epson Corporation, Tokyo (JP)

(72) Inventor: Takehiko Shindo, Daisen (JP)

(73) Assignee: SEIKO EPSON CORPORATION, Tokyo (JP)

(*) Notice: Subject to any disclaimer, the term of this patent is extended or adjusted under 35 U.S.C. 154(b) by 161 days.

(21) Appl. No.: 14/956,732

(22) Filed: Dec. 2, 2015

(65) Prior Publication Data

US 2016/0169675 A1    Jun. 16, 2016

(30) Foreign Application Priority Data

Dec. 11, 2014    (JP) .................................. 2014-250942

(51) Int. Cl.
  *G01C 19/00*    (2013.01)
  *G01C 19/5776*    (2012.01)
  *G01P 15/125*    (2006.01)

(52) U.S. Cl.
  CPC ........ *G01C 19/5776* (2013.01); *G01P 15/125* (2013.01)

(58) Field of Classification Search
  CPC .... G01C 19/56; G01C 19/5776; G01P 15/125
  USPC .................................. 73/510, 514.32, 504.04
  See application file for complete search history.

(56) References Cited

U.S. PATENT DOCUMENTS

| | | | | |
|---|---|---|---|---|
| 5,992,233 A | * | 11/1999 | Clark | ................. G01C 19/5719 73/514.32 |
| 2002/0051258 A1 | | 5/2002 | Tamura | |
| 2010/0206075 A1 | | 8/2010 | Oshio | |
| 2011/0100126 A1 | * | 5/2011 | Jeong | ................. G01C 19/5719 73/514.32 |
| 2011/0115038 A1 | | 5/2011 | Kanemoto | |
| 2013/0298668 A1 | | 11/2013 | Sato | |

FOREIGN PATENT DOCUMENTS

| | | |
|---|---|---|
| JP | 2002-005950 | 1/2002 |
| JP | 2010-217170 | 9/2010 |
| JP | 2011-128132 | 6/2011 |
| JP | 2013-235534 | 11/2013 |

* cited by examiner

*Primary Examiner* — Walter L Lindsay, Jr.
*Assistant Examiner* — Ruth Labombard
(74) *Attorney, Agent, or Firm* — Oliff PLC

(57) ABSTRACT

A sensor device includes a first physical quantity sensor, a drive section adapted to generate a drive signal for driving the first physical quantity sensor with a drive frequency, a second physical quantity sensor, and an output section adapted to generate an output signal based on a signal from the second physical quantity sensor and a signal having a frequency n times (n is an integer equal to or greater than 1) as high as the drive frequency.

20 Claims, 10 Drawing Sheets

SENSOR DEVICE, ELECTRONIC APPARATUS, AND MOVING OBJECT

BACKGROUND

1. Technical Field

The present invention relates to a sensor device, an electronic apparatus, and a moving object.

2. Related Art

There has been developed a composite sensor equipped with a plurality of physical quantity sensors. For example, in JP-A-2010-217170 (Document 1), there is disclosed a composite sensor having an angular velocity sensor and an acceleration sensor housed in the same package. Further, for example, in JP-A-2002-5950 (Document 2), there is disclosed a composite sensor having an angular velocity sensor and an acceleration sensor formed on the same substrate.

In the case of including a vibratory physical quantity sensor as one of the physical quantity sensors as the composite sensors in Document 1 and Document 2, it is common that a drive circuit for generating a drive signal for driving the physical quantity sensor is provided. In the case of making such a drive circuit operate, the operation is accompanied by a significant current variation, and therefore apt to cause power supply noise or radiation noise. Therefore, there is a possibility that such noises affect detection circuits of other physical quantity sensors for processing faint signals to cause noise in the output of the detection circuits. For example, there is a possibility that there is generated beat noise based on the frequency difference between the frequency of the drive signal of one physical quantity sensor and a sampling frequency of the output of the other physical quantity sensor.

SUMMARY

An advantage of some aspects of the invention is to provide a sensor device, an electronic apparatus, and a moving object each capable of reducing generation of noise.

The invention and can be implemented as the following aspects and application examples.

APPLICATION EXAMPLE 1

A sensor device according to this application example includes a first physical quantity sensor, a drive section adapted to generate a drive signal for driving the first physical quantity sensor with a drive frequency, a second physical quantity sensor, and an output section adapted to generate an output signal based on a signal from the second physical quantity sensor and a signal having a frequency n times as high as the drive frequency assuming n as an integer one of equal to and greater than 1.

According to this application example, since the output signal is generated based on the signal from the second physical quantity sensor and the signal having the frequency n times (n is an integer equal to or greater than 1) as high as the drive frequency, the generation of the beat noise can be suppressed compared to the case of using other frequencies. Therefore, it is possible to realize the sensor device capable of reducing the generation of the noise.

APPLICATION EXAMPLE 2

In the sensor device described above, the signal having the frequency n times as high as the drive frequency may be a signal from the drive section.

According to this application example, the reference signal of the output section can easily be generated based on the signal output by the drive section for generating the drive signal.

APPLICATION EXAMPLE 3

The sensor device described above may further include a filter section, to which the signal from the drive section is input, and which has filter characteristics of transmitting a signal in a first band including the drive frequency, and attenuating a signal in a second band higher than the first band, in which the signal having the frequency n times as high as the drive frequency may be a signal from the filter section.

According to this application example, since the high-frequency noise included in the signal from the drive section can be suppressed using the filter section, the sensor device capable of reducing the risk of malfunction can be realized.

APPLICATION EXAMPLE 4

The sensor device described above may further include a waveform shaping section to which a signal from the drive section is input, in which the signal having the frequency n times as high as the drive frequency may be a signal from the waveform shaping section.

According to this application example, since the signal having the frequency n times as high as the drive frequency and the waveform shaped can be generated using the waveform shaping section, it is possible to realize the sensor device capable of reducing the risk of malfunction.

APPLICATION EXAMPLE 5

The sensor device described above may further include a level-shift section adapted to decrease an amplitude of the signal from the drive section, in which the signal having the frequency n times as high as the drive frequency may be a signal from the level-shift section.

According to this application example, it is possible to make the output section operate at a voltage lower than that of the drive section.

APPLICATION EXAMPLE 6

In the sensor device described above, the first physical quantity sensor may be an angular velocity sensor, and the second physical quantity sensor is an acceleration sensor.

According to this application example, since the output signal is generated based on the signal from the acceleration sensor and the signal having the frequency n times (n is an integer equal to or greater than 1) as high as the drive frequency of the angular velocity sensor, the generation of the beat noise can be suppressed compared to the case of using other frequencies.

APPLICATION EXAMPLE 7

An electronic apparatus according to this application example includes any one of the sensor devices described above.

APPLICATION EXAMPLE 8

A moving object according to this application example includes any one of the sensor devices described above.

According to the electronic apparatus and the moving object, since there is included the sensor device capable of reducing the generation of the noise, the electronic apparatus and the moving object high in operation reliability can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some preferred embodiments of the invention will be described in detail using the accompanying drawings. The drawings used herein are for the sake of convenience of explanation. It should be noted that the embodiments described below do not unreasonably limit the contents of the invention as set forth in the appended claims. Further, all of the constituents described below are not necessarily essential elements of the invention.

1. Sensor Device
1-1. First Embodiment

Figure 1:
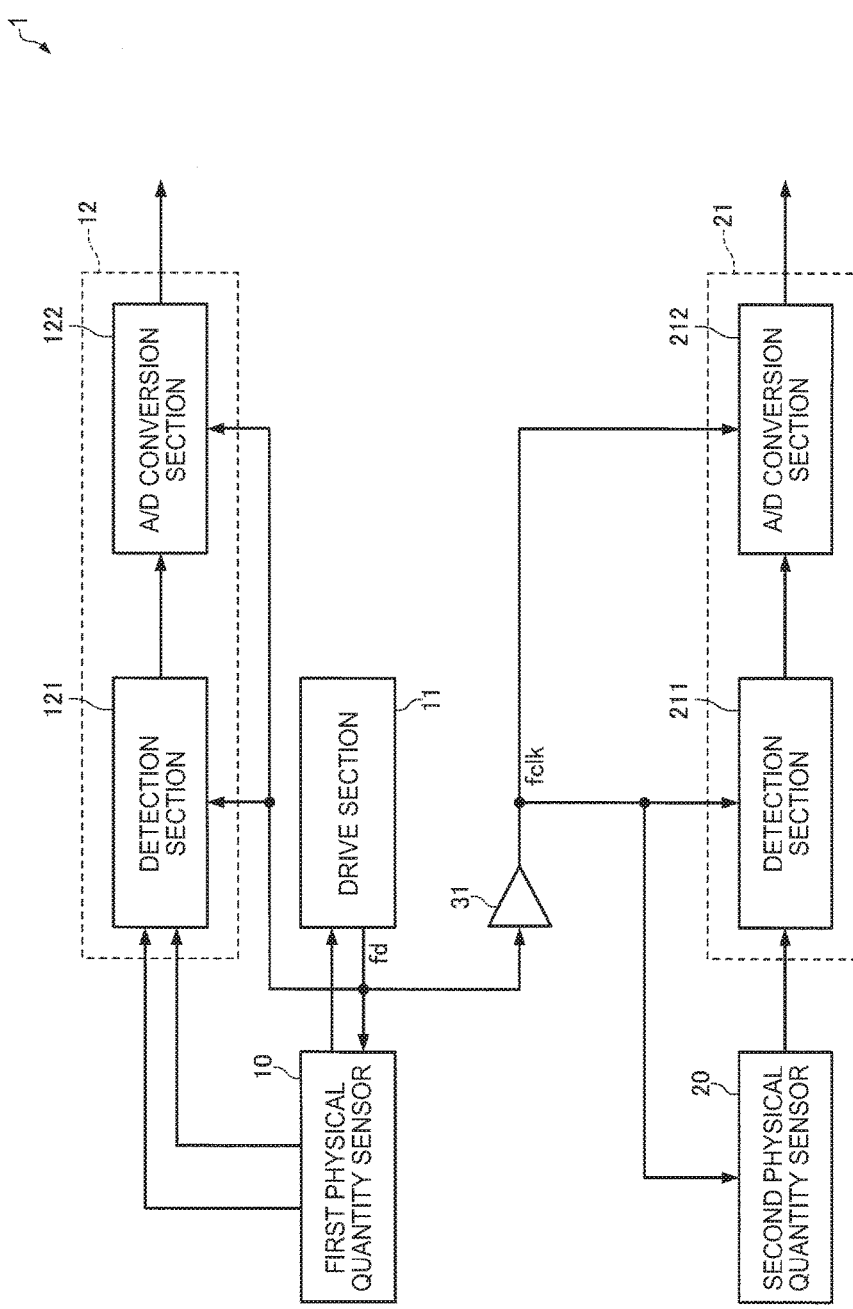
FIG. 1 is a circuit diagram of a sensor device 1 according to a first embodiment of the invention.

FIG. 1 is a circuit diagram of a sensor device 1 according to a first embodiment.

The sensor device 1 according to the present embodiment is provided with a first physical quantity sensor 10, a drive section 11 for generating a drive signal for driving the first physical quantity sensor 10 with a drive frequency fd, a second physical quantity sensor 20, and an output section 21 for generating an output signal based on a signal from the second physical quantity sensor 20 and a reference signal having a frequency fclk n times (n is an integer equal to or greater than 1) as high as the drive frequency fd. In FIG. 1, there is shown the case of n=1, namely the case in which the drive frequency fd and the frequency fclk of the reference signal are equal to each other. Further, in the example shown in FIG. 1, the sensor device 1 is provided with an output section 12 and a buffer amplifier 31.

The first physical quantity sensor 10 detects a first physical quantity. As the first physical quantity, there can be adopted a variety of physical quantities such as angular velocity, acceleration, and pressure. In the present embodiment, the first physical quantity is angular velocity. Further, in the present embodiment, the first physical quantity sensor 10 is a vibratory physical quantity sensor using a quartz crystal resonator or an MEMS (Micro Electro-Mechanical Systems) resonator. The first physical quantity sensor 10 outputs a signal corresponding to the first physical quantity to the output section 12.

The drive section 11 generates the drive signal for driving the first physical quantity sensor 10 with the drive frequency fd. It is also possible for the drive section 11 to generate the drive signal while receiving the signal feedback from the first physical quantity sensor 10. It is also possible for the drive section 11 to output the drive signal to the output section 21 via the buffer amplifier 31. It is also possible for the drive section 11 to output the drive signal to the second physical quantity sensor 20 via the buffer amplifier 31.

The output section 12 generates the output signal based on the signal from the first physical quantity sensor 10 and the drive signal. In the present embodiment, the output section 12 is configured including a detection section 121 and an A/D conversion section 122.

It is possible for the detection section 121 to synchronously detect the signal from the first physical quantity sensor 10 based on the drive signal. It is also possible for the detection section 121 to perform an amplifying process and a filter process on the output signal of the first physical quantity sensor 10. It is also possible for the detection section 121 to amplify the signal on which the synchronous detection has been performed, or to perform the filter process on the signal.

Figure 2:
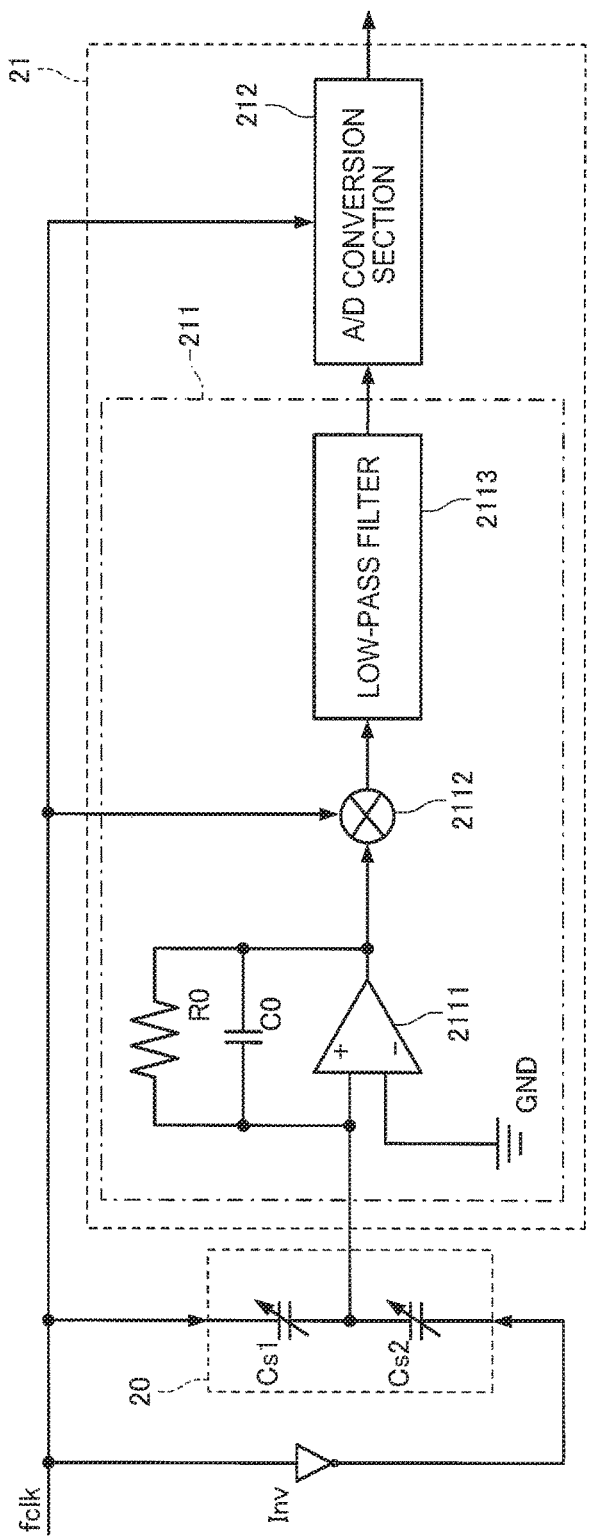
FIG. 2 is a circuit diagram showing a specific example of a second physical quantity sensor 20 and an output section 21.

FIG. 2 is a circuit diagram showing a specific example of the second physical quantity sensor 20 and the output section 21.

The second physical quantity sensor 20 detects a second physical quantity. As the second physical quantity, there can be adopted a variety of physical quantities such as angular velocity, acceleration, and pressure. In the present embodiment, the second physical quantity is acceleration. In the present embodiment, the second physical quantity sensor 20 is a variable capacitance physical quantity sensor. In FIG. 2, the second physical quantity sensor 20 is expressed as equivalent capacitances Cs1, Cs2 connected in series to each other. In the example shown in FIG. 2, the reference signal with the frequency fclk is input to one end of the equivalent capacitance Cs1, and a signal obtained by inverting the reference signal using an inverter Inv is input to one end of the equivalent capacitance Cs2. The second physical quantity sensor 20 outputs a signal corresponding to the second physical quantity from a connection point between the equivalent capacitances Cs1, Cs2 to the output section 21.

The output section 21 generates the output signal based on the signal from the second physical quantity sensor 20 and the reference signal having the frequency fclk n times (n is an integer equal to or greater than 1) as high as the drive frequency fd. In the present embodiment, the frequency fclk of the reference signal is equal to the drive frequency fd (n=1). In the present embodiment, the output section 21 is configured including a detection section 211 and an A/D conversion section 212.

It is possible for the detection section 211 to synchronously detect the signal from the second physical quantity sensor 20 based on the drive signal. It is also possible for the detection section 211 to perform an amplifying process and a filter process on the output signal of the second physical quantity sensor 20. It is also possible for the detection section 211 to amplify the signal on which the synchronous detection has been performed, or to perform the filter process on the signal.

In the example shown in FIG. 2, the detection section 211 is configured including an amplifier circuit 2111, a synchronous detection circuit 2112, a low-pass filter 2113, a resistor R0, and a capacitor C0.

A non-inverting input terminal of the amplifier circuit 2111 is connected to the output terminal of the second physical quantity sensor 20, an inverting input terminal thereof is connected to the ground potential GND, and an output terminal thereof is connected to an input terminal of the synchronous detection circuit 2112. The resistor R0 is a feedback resistor of the amplifier circuit 2111. The capacitor C0 is a feedback capacitor of the amplifier circuit 2111.

The synchronous detection circuit 2112 performs the synchronous detection on the output signal of the amplifier circuit 2111 based on the reference signal with the frequency fclk. The output terminal of the synchronous detection circuit 2112 is connected to an input terminal of the low-pass filter 2113.

The low-pass filter 2113 performs a low-pass filter process on the output signal of the synchronous detection circuit 2112. An output terminal of the low-pass filter 2113 is connected to an input terminal of the A/D conversion section 212.

The A/D conversion section 212 performs analog-to-digital conversion for converting the output signal of the detection section 211 into a digital signal. In the example shown in FIGS. 1 and 2, the A/D conversion section 212 performs the analog-to-digital conversion on the output signal of the detection section 211 based on the reference signal with the frequency fclk. In the example shown in FIGS. 1 and 2, the output signal of the A/D conversion section 212 becomes the output signal of the output section 21.

The drive section 11 acts with a significant current variation with a period corresponding to the drive frequency fd in order to generate the drive signal for driving the first physical quantity sensor 10. Therefore, the drive section 11 is apt to cause the power supply noise or the radiation noise, and the noise includes a noise component having the drive frequency fd.

In the case in which the radiation noise is generated as a first example, the noise component having the drive frequency fd is superimposed on a faint signal, which is output from the second physical quantity sensor 20 and input to the detection section 211. Then, the signal including the noise component having the drive frequency fd is amplified by the amplifier circuit 2111, and is synchronously detected by the synchronous detection circuit 2112 based on the frequency fclk of the reference signal.

In the case in which the power supply noise is generated as a second example, since the drive section 11 acts with the current having a significant variation from the power supply, the gain of the amplifier circuit 2111, which is connected to the power supply common to the drive section 11, varies to superimpose the noise component having the drive frequency fd on the output signal of the amplifier circuit 2111. Then, the output signal of the amplifier circuit 2111 including the noise component having the drive frequency fd is synchronously detected by the synchronous detection circuit 2112 based on the frequency fclk of the reference signal.

Here, if there exists a frequency difference $\Delta f$ between the frequency n times (n is an integer equal to or greater than 1) as high as the drive frequency fd and the frequency of the reference signal of the synchronous detection circuit 2112, the beat noise including the frequency component of $\Delta f$ is generated in the output of the synchronous detection circuit 2112. It should be noted that since the frequency ($\Delta f$) of the beat noise is a low frequency, and is included in or approximates to the use frequency band of the signal of the desired physical quantity to be detected by the second physical quantity sensor 20, it is difficult to sufficiently remove the beat noise component by a filter such as the low-pass filter 2113.

In contrast, according to the sensor device 1 related to the present embodiment, since the output signal is generated based on the signal from the second physical quantity sensor 20 and the reference signal having the frequency fclk n times (n is an integer equal to or greater than 1) as high as the drive frequency fd, the generation of the beat noise can be reduced compared to the case of using other frequencies as the reference signal. Therefore, it is possible to realize the sensor device 1 capable of reducing the generation of the noise. In more detail, since the frequency fclk of the reference signal is n times (n is an integer equal to or greater than 1) as high as the drive frequency fd, the generation of the beat noise due to the frequency difference $\Delta f$ between the frequency n times as high as the drive frequency fd and the frequency fclk of the reference signal can be reduced.

In the present embodiment, the buffer amplifier 31 can be omitted. Specifically, even in the case of adopting the configuration in which the signal from the drive section 11 is directly input to the second physical quantity sensor 20 and the output section 21, the sensor device 1 capable of reducing the generation of the noise can be realized.

In the present embodiment, the reference signal can also be a signal from the drive section 11. More specifically, the reference signal is a signal based on the drive signal output by the drive section 11. In the example shown in FIG. 1, the reference signal is a signal output from the buffer amplifier 31 based on the drive signal.

According to the sensor device 1 related to the present embodiment, the reference signal can easily be generated based on the signal output by the drive section 11 for generating the drive signal. Further, since the reference signal is a signal based on the drive signal output by the drive section 11, even in the case in which manufacturing variations, a variation in the frequency adjustment, and so on occur in the drive frequency fd, it is possible to coincide the frequency n times (n is an integer equal to or greater than 1) as high as the drive frequency fd of the drive signal and the frequency fclk of the reference signal with each other. Therefore, the beat noise caused by the difference between the frequency n times as high as the drive frequency fd and the frequency fclk can be reduced.

Although the example shown in FIG. 2 is an example in which the detection section 211 performs the synchronous detection, the invention is not limited to this example, and a configuration of using a charge amplifier using a switched capacitor can also be adopted. In this case, it is also possible to perform the control of the switched capacitor based on the reference signal with the frequency fclk. Also in this case, substantially the same advantage is obtained for substantially the same reason as that of the configuration described above.

1-2. Second Embodiment

Figure 3:
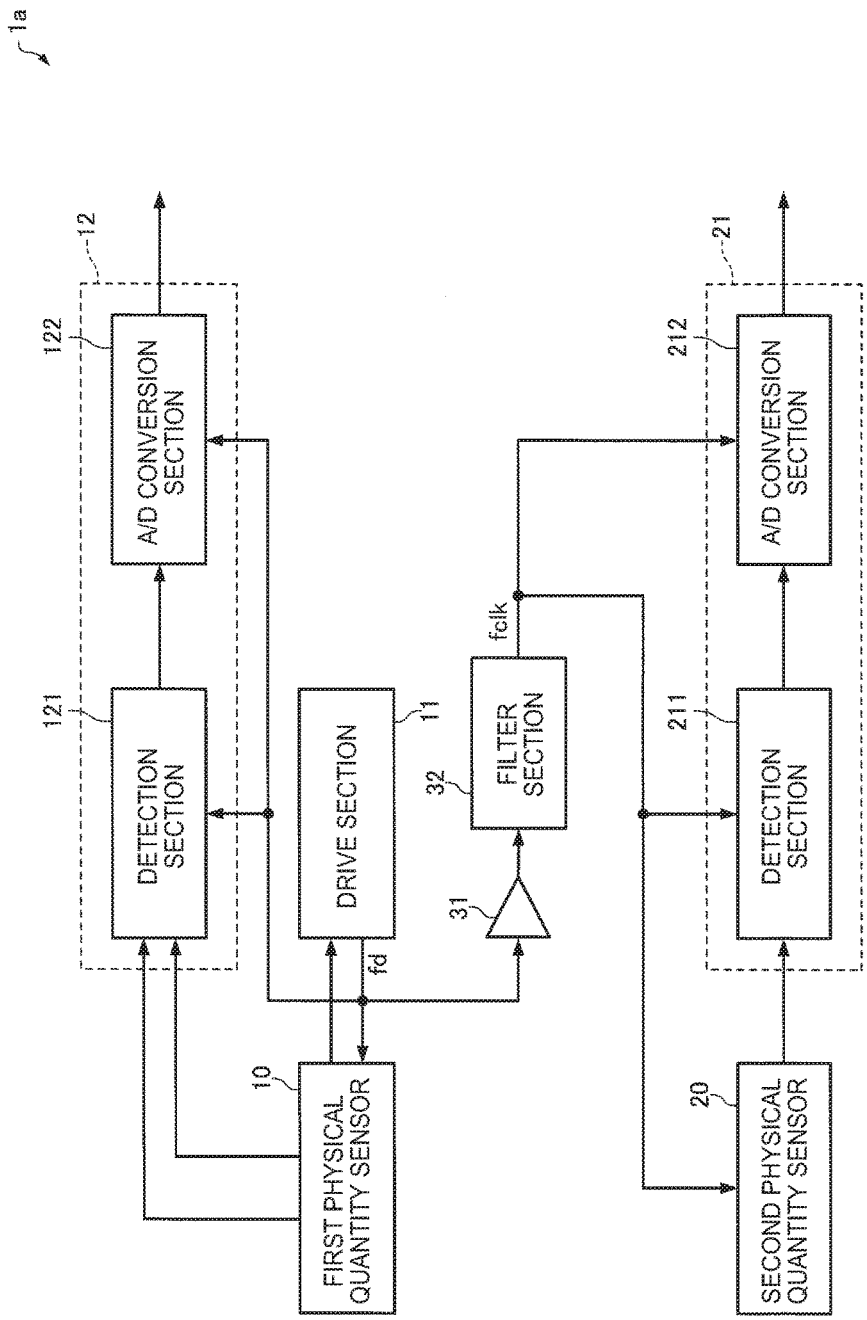
FIG. 3 is a circuit diagram of a sensor device 1a according to a second embodiment of the invention.

FIG. 3 is a circuit diagram of a sensor device 1a according to a second embodiment. The constituents similar to those of the sensor device 1 according to the first embodiment are denoted by the same reference symbols, and the detailed explanation thereof will be omitted.

The sensor device 1a according to the present embodiment is provided with a filter section 32, to which the signal from the drive section 11 is input, and which has filter characteristics of transmitting signals in a first band including the drive frequency fd, and attenuating signals in a second band higher than the first band. Further, the reference signal with the frequency fclk is a signal from the filter section 32.

In the example shown in FIG. 3, an input terminal of the filter section 32 is connected to the output terminal of the buffer amplifier 31, and an output terminal of the filter section 32 is connected to the second physical quantity sensor 20 and the output section 21. To the filter section 32, there is input the signal from the drive section 11 via the buffer amplifier 31. In other words, the signal from the drive section 11 is input to the second physical quantity sensor 20 and the output section 21 via the buffer amplifier 31 and the filter section 32. The filter section 32 can also be a low-pass filter transmitting signals in the first band including the drive frequency fd. The filter section 32 can also be a band-pass filter transmitting signals in the first band including the drive frequency fd.

According to the sensor device 1a related to the present embodiment, since the high-frequency noise included in the signal from the drive section 11 can be reduced using the filter section 32, it is possible to realize the sensor device 1a capable of reducing the risk of malfunction.

Further, also in the sensor device 1a, substantially the same advantages can be obtained for substantially the same reason as in the sensor device 1 according to the first embodiment.

In the present embodiment, the buffer amplifier 31 can be omitted. Specifically, by adopting a configuration in which the signal from the drive section 11 is input to the second physical quantity sensor 20 and the output section 21 via at least the filter section 32, it is possible to reduce the high-frequency noise included in the signal from the drive section 11.

Further, although the example shown in FIG. 3 has a configuration in which the signal from the drive section 11 is directly input to the detection section 121 and the A/D conversion section 122, it is also possible to adopt a configuration of inputting the signal from the filter section 32 to the detection section 121 and the A/D conversion section 122. Thus, since the high-frequency noise included in the signal from the drive section 11 can be reduced using the filter section 32, it is possible to realize the sensor device 1a capable of reducing the risk of malfunction with respect to a circuit connected to both of the first physical quantity sensor 10 and the second physical quantity sensor 20.

1-3. Third Embodiment

Figure 4:
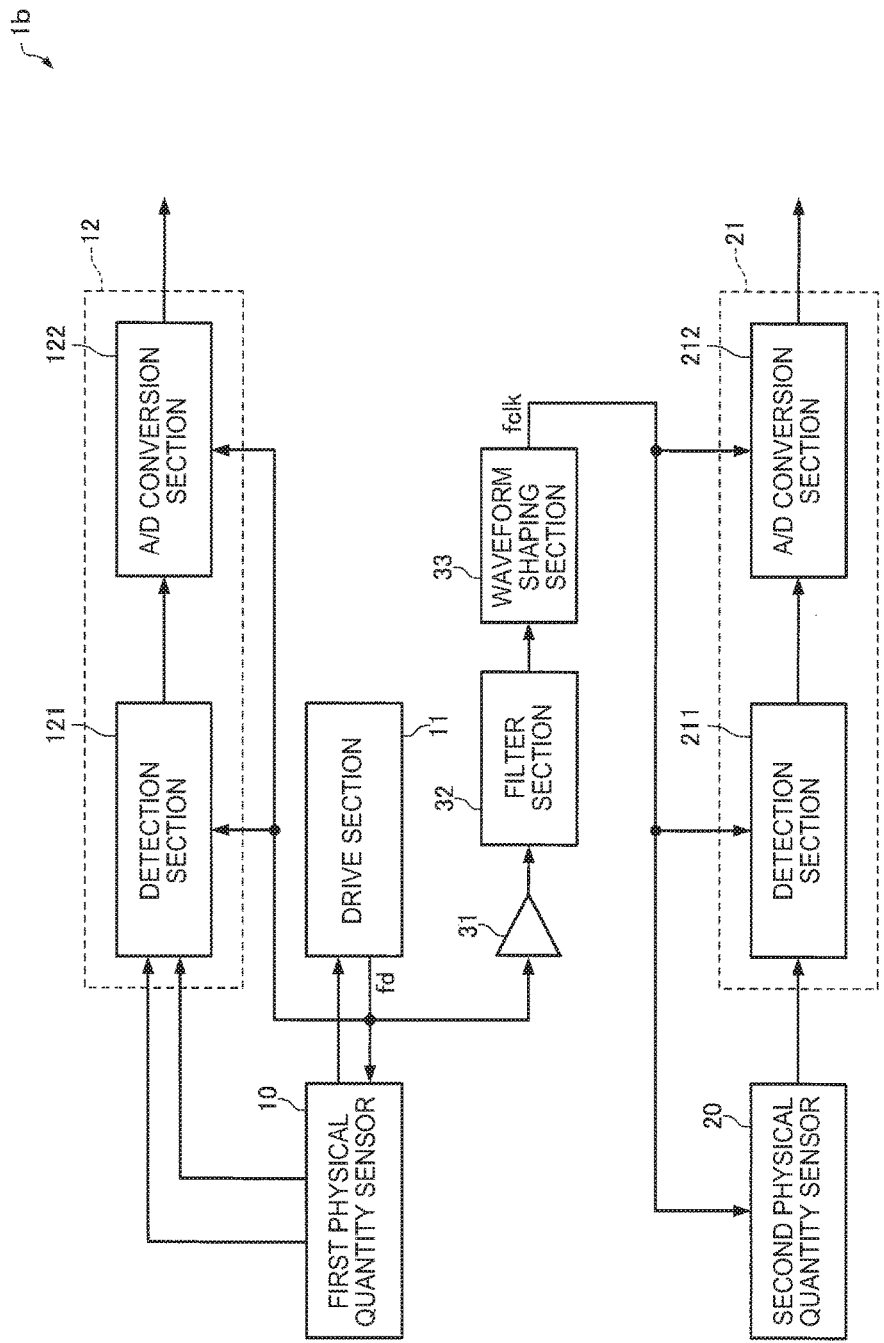
FIG. 4 is a circuit diagram of a sensor device 1b according to a third embodiment of the invention.

FIG. 4 is a circuit diagram of a sensor device 1b according to a third embodiment. The constituents similar to those of the sensor device 1a according to the second embodiment are denoted by the same reference symbols, and the detailed explanation thereof will be omitted.

The sensor device 1b according to the present embodiment is provided with a waveform shaping section 33 to which the signal from the drive section 11 is input. Further, the reference signal with the frequency fclk is a signal from the waveform shaping section 33.

In the example shown in FIG. 4, an input terminal of the waveform shaping section 32 is connected to the output terminal of the filter section 32, and an output terminal of the waveform shaping section 33 is connected to the second physical quantity sensor 20 and the output section 21. To the waveform shaping section 33, there is input the signal from the drive section 11 via the buffer amplifier 31 and the filter section 32. In other words, the signal from the drive section 11 is input to the second physical quantity sensor 20 and the output section 21 via the buffer amplifier 31, the filter section 32, and the waveform shaping section 33. The waveform shaping section 33 shapes the signal input from the filter section 32 into a rectangular wave, and then outputs the rectangular wave.

According to the sensor device 1b, since the reference signal shaped in the waveform by the waveform shaping section 33 can be generated, it is possible to realize the sensor device 1b capable of reducing the risk of malfunction. In particular in the case in which the output section 21 performs the synchronous detection based on the reference signal, by shaping the waveform into a rectangular wave using the waveform shaping section 33, the detection efficiency can be enhanced.

In the present embodiment, it is also possible to omit at least either one of the buffer amplifier 31 and the filter section 32. Specifically, by adopting a configuration in which the signal from the drive section 11 is input to the second physical quantity sensor 20 and the output section 21 via at least the waveform shaping section 33, the reference signal shaped in the waveform by the waveform shaping section 33 can be generated, and therefore, it is possible to realize the sensor device 1b capable of reducing the risk of malfunction.

Further, also in the sensor device 1b, substantially the same advantages can be obtained for substantially the same reason as in the sensor device 1 according to the first embodiment and the sensor device 1a according to the second embodiment.

Further, although the example shown in FIG. 4 has a configuration in which the signal from the drive section 11 is directly input to the detection section 121 and the A/D conversion section 122, it is also possible to adopt a configuration of inputting the signal from the waveform shaping section 33 to the detection section 121 and the A/D conversion section 122. Thus, since it is possible to generate the reference signal shaped in the waveform by the waveform shaping section 33, it is possible to realize the sensor device 1b capable of reducing the risk of malfunction with respect to both of the output section 12 connected to the first physical quantity sensor 10 and the output section 21 connected to the second physical quantity sensor 20.

1-4. Fourth Embodiment

Figure 5:
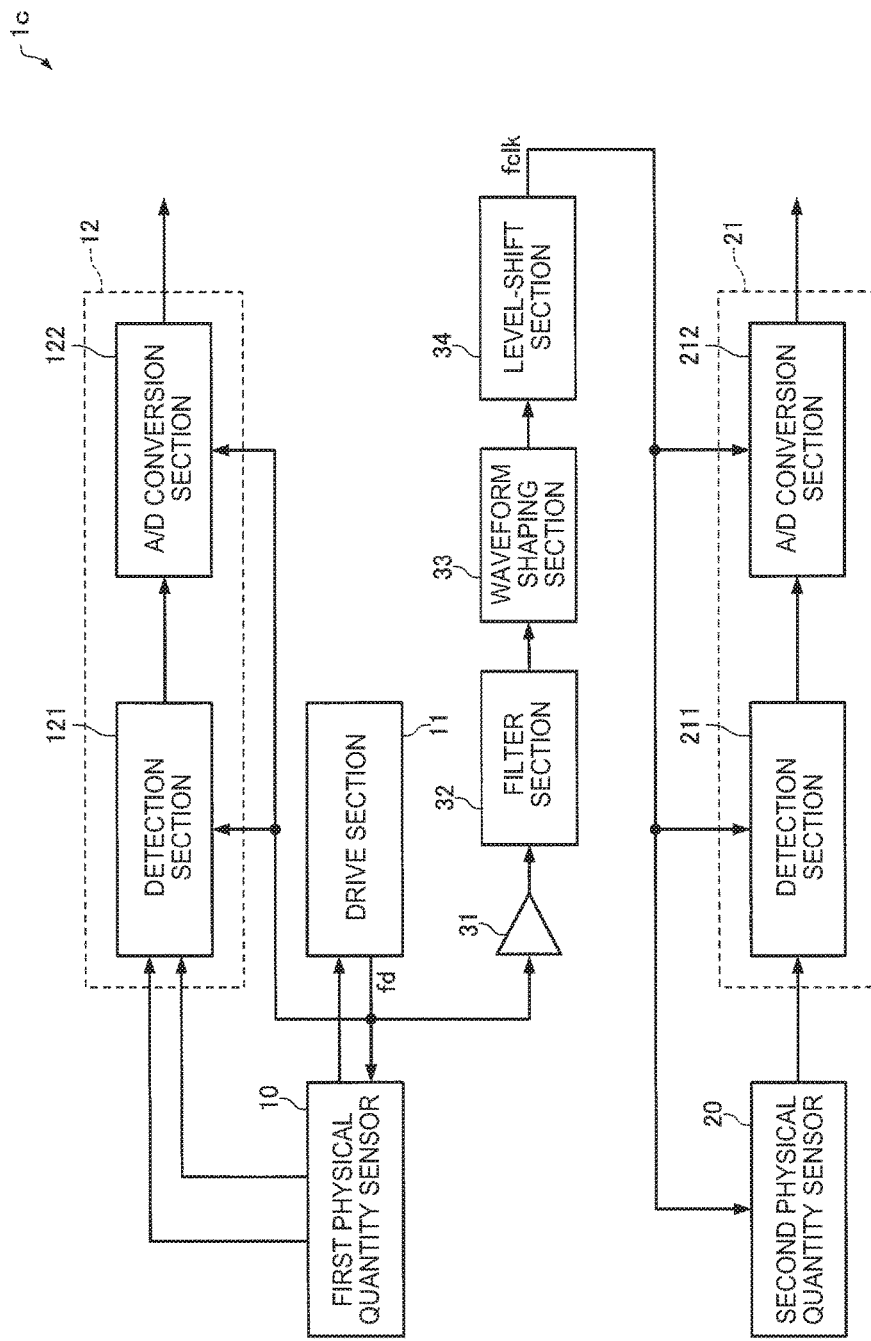
FIG. 5 is a circuit diagram of a sensor device 1c according to a fourth embodiment of the invention.

FIG. 5 is a circuit diagram of a sensor device 1c according to a fourth embodiment. The constituents similar to those of the sensor device 1b according to the third embodiment are denoted by the same reference symbols, and the detailed explanation thereof will be omitted.

The sensor device 1c according to the present embodiment is provided with a level-shift section 34 for decreasing the amplitude of the signal from the drive section 11. Further, the reference signal with the frequency fclk is a signal from the level-shift section 34.

In the example shown in FIG. 5, an input terminal of the level-shift section 34 is connected to the output terminal of the waveform shaping section 33, and an output terminal of the level-shift section 34 is connected to the second physical quantity sensor 20 and the output section 21. To the level-shift section 34, there is input the signal from the drive section 11 via the buffer amplifier 31, the filter section 32, and the waveform shaping section 33. In other words, the signal from the drive section 11 is input to the second physical quantity sensor 20 and the output section 21 via the buffer amplifier 31, the filter section 32, the waveform shaping section 33, and the level-shift section 34. In the present embodiment, the level-shift section 34 decreases the voltage amplitude of the output signal of the waveform shaping section 33.

According to the sensor device 1c related to the present embodiment, it is possible to make the output section 21 act at a voltage lower than that of the drive section 11.

In the present embodiment, it is also possible to omit at least either one of the buffer amplifier 31, the filter section 32, and the waveform shaping section 33. Specifically, by adopting a configuration in which the signal from the drive section 11 is input to the second physical quantity sensor 20 and the output section 21 via at least the level-shift section 34, it is possible to make the output section 21 act at the voltage lower than that of the drive section 11.

Further, also in the sensor device 1c, substantially the same advantages can be obtained for substantially the same reason as in the sensor device 1 according to the first embodiment, the sensor device 1a according to the second embodiment, and the sensor device 1b according to the third embodiment.

Further, although the example shown in FIG. 5 has a configuration in which the signal from the drive section 11 is directly input to the detection section 121 and the A/D conversion section 122, it is also possible to adopt a configuration of inputting the signal from the level-shift section 34 to the detection section 121 and the A/D conversion section 122. Thus, it is possible to make both of the output section 12 connected to the first physical quantity sensor 10 and the output section 21 connected to the second physical quantity sensor 20 act at a voltage lower than that of the drive section 11.

1-5. Fifth Embodiment

Figure 6:
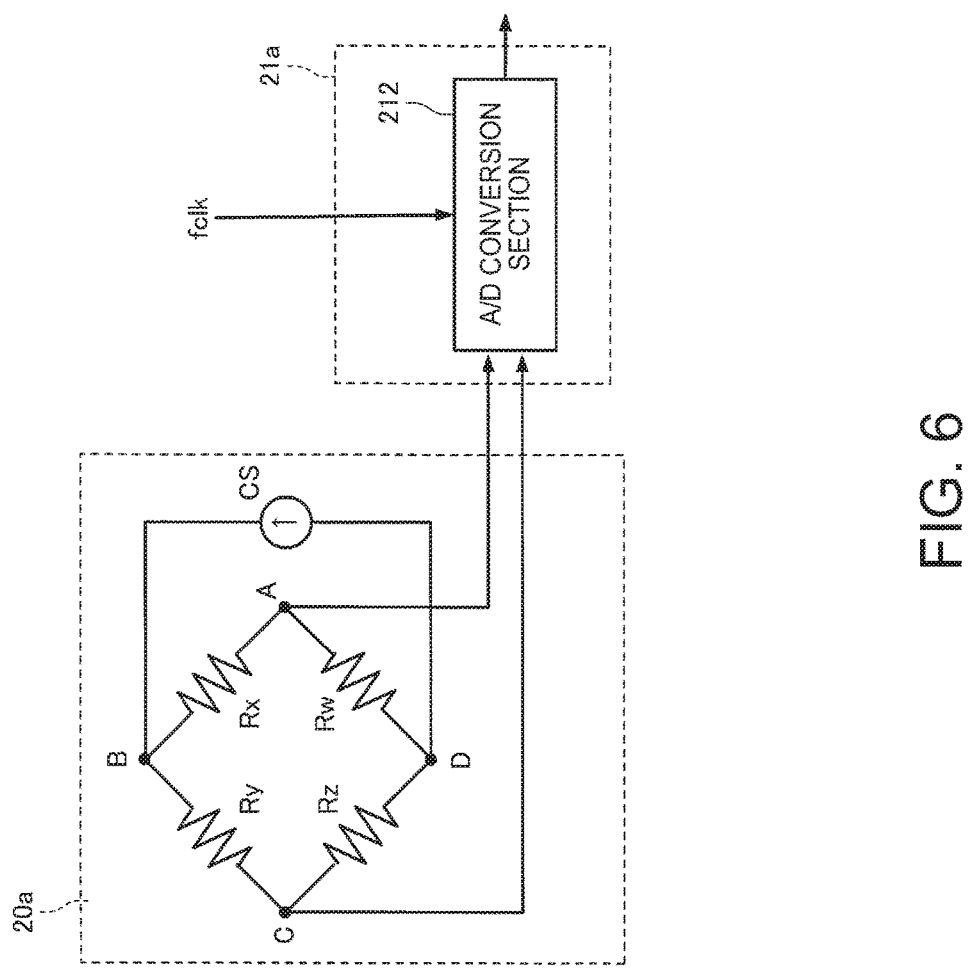
FIG. 6 is a circuit diagram of a second physical quantity sensor 20a and an output section 21a according to a fifth embodiment of the invention.

FIG. 6 is a circuit diagram of a second physical quantity sensor 20a and an output section 21a according to a fifth embodiment of the invention. In either of the sensor device 1 according to the first embodiment, the sensor device 1a according to the second embodiment, the sensor device 1b according to the third embodiment, and the sensor device 1c according to the fourth embodiment described above, it is possible to adopt the second physical quantity sensor 20a instead of the second physical quantity sensor 20, and adopt the output section 21a instead of the output section 21.

The second physical quantity sensor 20a shown in FIG. 6 is a variable resistance physical quantity sensor. In the example shown in FIG. 6, the second physical quantity sensor 20a is configured including resistors Rw, Rx, Ry, and Rz constituting a Wheatstone bridge, and a current source CS.

The current source CS supplies a current between a connection point (a node B) between the resistors Rx, Ry, and a connection point (a node D) between the resistors Rz, Rw. Variations of the resistors Rw, Rx, Ry, and Rz constituting the Wheatstone bridge are output to the output section 21a as a variation of the potential between a connection point (a node A) between the resistors Rw, Rx and a connection point (a node C) between the resistors Ry, Rz.

The output section 21a is configured including the A/D conversion section 212. The A/D conversion section 212 performs analog-to-digital conversion on an output signal of the second physical quantity sensor 20a. In the example shown in FIG. 6, the A/D conversion section 212 performs the analog-to-digital conversion on the output signal of the second physical quantity sensor 20a based on the reference signal with the frequency fclk. In the example shown in FIG. 6, the output signal of the A/D conversion section 212 becomes the output signal of the output section 21a.

Also in such a configuration, substantially the same advantages can be obtained for substantially the same reason as in the sensor device 1 according to the first embodiment, the sensor device 1a according to the second embodiment, the sensor device 1b according to the third embodiment, and the sensor device 1c according to the fourth embodiment.

1-6. Sixth Embodiment

Although in the first through fifth embodiments, there is described the case of n=1, namely the case in which the drive frequency fd and the frequency fclk of the reference signal are equal to each other, it is also possible to provide a multiplier circuit for multiplying the frequency fd of the signal from the drive section 11 by n and then outputting the result in each of the embodiments. As an example, the configuration of providing the multiplier circuit in the first embodiment will hereinafter be explained using FIG. 7.

Figure 7:
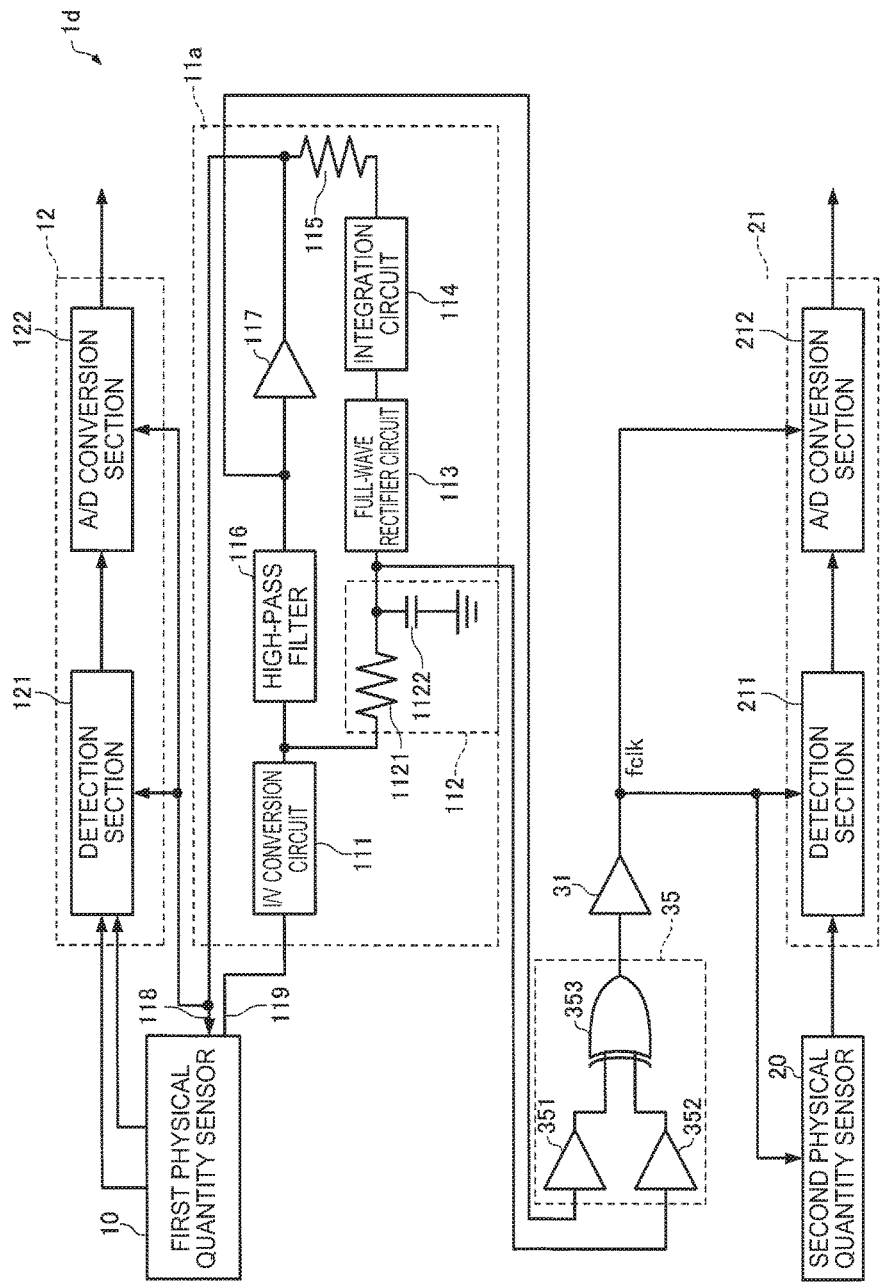
FIG. 7 is a circuit diagram of a sensor device 1d according to a sixth embodiment of the invention.

FIG. 7 is a circuit diagram of a sensor device 1d according to a sixth embodiment. A drive section 11a is configured including an I/V conversion circuit 111, a low-pass filter 112, a full-wave rectifier circuit 113, an integration circuit 114, a pull-up resistor 115, a high-pass filter 116, and a comparator 117.

The I/V conversion circuit 111 converts the alternating current signal from the first physical quantity sensor 10 into a voltage signal, and then outputs the voltage signal. The I/V conversion circuit 111 can also be a Q/V conversion circuit for changing the charge to the voltage, and then outputting the voltage. An output signal of the I/V conversion circuit 111 is input to the comparator 117 with the direct current component removed by the high-pass filter 116. The comparator 117 amplifies the voltage of the input signal to output a binarized signal (a rectangular wave voltage signal). It should be noted that in the present embodiment, the comparator 117 is a comparator having an open drain output capable of outputting only a low level, and regarding a high level, pull-up to the output voltage of the integration circuit 114 is performed via the pull-up resistor 115. Further, the binarized signal output by the comparator 117 is supplied to the first physical quantity sensor 10 as a drive signal 118.

Further, in the present embodiment, the amplitude of the drive signal 118 is adjusted so that the oscillating current of the first physical quantity sensor 10 becomes constant, namely so that the level of the output voltage of the I/V conversion circuit 111 becomes constant. By adjusting the amplitude as described above, it is possible to extremely stably oscillate the first physical quantity sensor 10 to thereby improve the detection accuracy of the angular velocity.

The low-pass filter 112 is an RC filter including a resistor 1121 and a capacitor 1122. The low-pass filter 112 functions not only as a primary low-pass filter, but also as a phase shift circuit for shifting the phase as much as about 90 degrees with respect to the input signal. An output signal of the I/V conversion circuit 111 is input to the full-wave rectifier circuit 113 via the low-pass filter 112.

The full-wave rectifier circuit performs the full-wave rectification on the signal input to output the result to the integration circuit 114.

The integration circuit 114 integrates the signal input to obtain a voltage, and then outputs the voltage. Since the high level of the drive signal 118 is realized by the pull-up to the output voltage of the integration circuit 114 via the pull-up resistor 115, the larger the amplitude of the output signal of the I/V conversion circuit 111 is, the lower the output voltage of the integration circuit 114 becomes. Due to such a configuration as described above, the feedback control of the amplitude level of the drive signal 119 is performed so that the amplitude of the oscillating current of the first physical quantity sensor 10 is kept constant.

Further, the sensor device 1d according to the present embodiment is provided with the multiplier circuit 35. The multiplier circuit 35 is provided with an exclusive-OR (EXOR) circuit 353 for performing an exclusive-OR operation of a binarized signal output by a comparator 351 and a binarized signal output by a comparator 352. As described above, the output signal of the I/V conversion circuit 111 passes through the low-pass filter 112, and thus, the phase of the output signal is delayed. As a result, the signal output by the comparator 351 and the signal output by the comparator 352 are the same in frequency, namely the drive frequency fd, but are different in phase from each other.

Therefore, the output signal of the exclusive-OR (EXOR) circuit 353 becomes a signal having a frequency twice as high as the frequency of the signal output by the comparator 351 and the signal output by the comparator 352, namely a signal having a frequency twice as high as the drive frequency fd.

As described above, in the present embodiment, focusing attention on the phase shift function of the low-pass filter 112, which is disposed for the purpose of suppressing the deterioration of the detection accuracy and the detection sensitivity of the angular velocity, by using the fact that the phase difference is inevitably generated between the two binarized signals, the exclusive-OR (EXOR) circuit 353 extremely small in circuit area and the comparators 351, 352 are added to generate the signal having the frequency twice as high as the drive frequency fd.

According to the sensor device 1d related to the present embodiment, the two output signals different in phase from each other output from the drive section 11a are input to the exclusive-OR (EXOR) circuit 353 to generate the signal having the twofold frequency. Therefore, it is possible to make the frequency fclk of the reference signal twice as high as the drive frequency fd while keeping the circuit area small.

Further, the frequency of the reference signal to be input to the A/D conversion section 212 can be increased, and thus, the A/D conversion high in sampling rate can be realized.

In the present embodiment, the buffer amplifier 31 can be omitted. Specifically, by adopting a configuration in which the signal from the drive section 11a is input to the second physical quantity sensor 20 and the output section 21 via at least the multiplier circuit 35, it is possible to realize the sensor device 1d exerting the advantages described above.

Further, in the present embodiment, it is also possible to arrange that the signal from the multiplier circuit 35 is input to the second physical quantity sensor 20 and the output section 21 not only via the buffer amplifier 31, but also via the filter section 32 and the waveform shaping section 33 described in detail in the description of the fourth embodiment. Further, as another example, it is also possible to select either one or both of the filter section 32 and the waveform shaping section 33 to dispose the result in the anterior or posterior stage of the buffer amplifier 31.

1-7. Modified Example of Physical Quantity Sensor

As the physical quantity sensor according to the invention, there can be adopted, for example, a variety of capacitance type physical quantity sensors and variable resistance (piezoresistance type) physical quantity sensors. For example, there can be adopted a physical quantity sensor for detecting the variation of the capacitance due to the movement of the movable weight section. Further, for example, there can be adopted a gyro sensor and a silicon diaphragm type pressure sensor. Further, for example, there can also be adopted the pressure sensor for deforming the silicon diaphragm by the air pressure in a cavity (a hollow chamber), and detecting the variation (the variation of the resistance value of the piezoresistance, or the like) of the capacitance due to the deformation.

2. Electronic Apparatus

Figure 8:
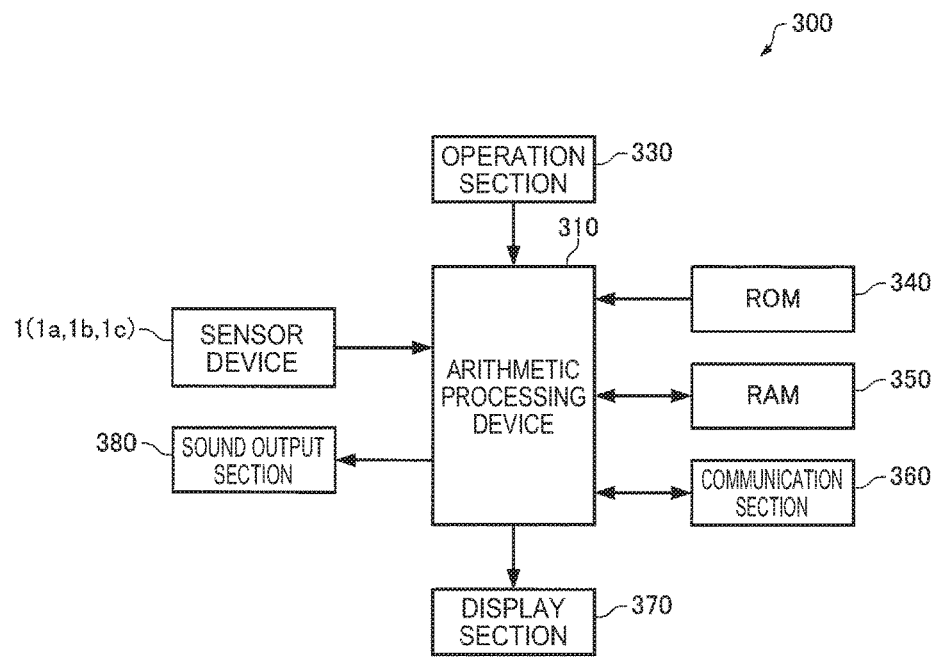
FIG. 8 is a functional block diagram of an electronic apparatus 300 according to the embodiment.

FIG. 8 is a functional block diagram of an electronic apparatus 300 according to the present embodiment. It should be noted that the constituents substantially the same as those of the embodiments described above are denoted with the same reference symbols, and the detailed description thereof will be omitted.

The electronic apparatus 300 according to the present embodiment is an electronic apparatus 300 including the sensor device 1, the sensor device 1a, the sensor device 1b, or the sensor device 1c. In the example shown in FIG. 8, the electronic apparatus 300 is configured including the sensor device 1, an arithmetic processing device 310, an operation section 330, a read only memory (ROM) 340, a random access memory (RAM) 350, a communication section 360, a display section 370, and a sound output section 380. It should be noted that the electronic apparatus 300 according to the present embodiment can also have a configuration obtained by eliminating or modifying some of the constituents (the sections) shown in FIG. 8, or adding another constituent.

The arithmetic processing device 310 performs a variety of calculation processes and control processes in accordance with programs stored in the ROM 340 and so on. Specifically, the arithmetic processing device 310 performs a variety of processes corresponding to the output signal of the sensor device 1 and the operation signal from the operation section 330, a process of controlling the communication section 360 for performing data communication with external devices, a process of transmitting a display signal for making the display section 370 display a variety of types of information, a process of making the sound output section 380 output a variety of sounds, and so on.

The operation section 330 is an input device including operation keys, button switches, and so on, and outputs the operation signal corresponding to the operation by the user to the arithmetic processing device 310.

The ROM 340 stores the programs, data, and so on for the arithmetic processing device 310 to perform the variety of calculation processes and the control processes.

The RAM 350 is used as a working area of the arithmetic processing device 310, and temporarily stores, for example, the program and data retrieved from the ROM 340, the data input from the operation section 330, and the arithmetic result obtained by the arithmetic processing device 310 performing operations in accordance with the various programs.

The communication section 360 performs a variety of control processes for achieving the data communication between the arithmetic processing device 310 and the external devices.

The display section 370 is a display device formed of a liquid crystal display (LCD), an electrophoretic display, or the like, and displays a variety of types of information based on the display signal input from the arithmetic processing device 310.

Further, the sound output section 380 is a device, such as a speaker, for outputting sounds.

According to the electronic apparatus 300 related to the present embodiment, since there is adopted the configuration including the sensor device 1 capable of reducing the generation of the noise, the electronic apparatus 300 high in operation reliability can be realized. It should be noted that even in the case in which the electronic apparatus 300 is configured including the sensor device 1a, the sensor device 1b, or the sensor device 1c instead of the sensor device 1, substantially the same advantages can be obtained.

As the electronic apparatus 300, a variety of types of electronic apparatus can be adopted. There can be cited, for example, a personal computer (e.g., a mobile type personal computer, a laptop personal computer, and a tablet personal computer), a mobile terminal such as a cellular phone, a digital still camera, an inkjet ejection device (e.g., an inkjet printer), a storage area network apparatus such as a router or a switch, a local area network apparatus, a mobile communication base station apparatus, a television set, a video camera, a video recorder, a car navigation system, a pager, a personal digital assistance (including one having a communication function), an electronic dictionary, an electronic calculator, an electronic game machine, a gaming controller, a word processor, a workstation, a picture phone, a security television monitor, an electronic binoculars, a POS (point-of-sale) terminal, a medical instrument (e.g., an electronic thermometer, a blood pressure monitor, a blood glucose monitor, an electrocardiograph, ultrasonic diagnostic equipment, and an electronic endoscope), a fish finder, a variety of measuring instruments, gauges (e.g., gauges for cars, aircrafts, and boats and ships), a flight simulator, a head-mount display, a motion tracer, a motion tracker, a motion controller, and a pedestrian dead reckoning (PDR) system.

Figure 9A:
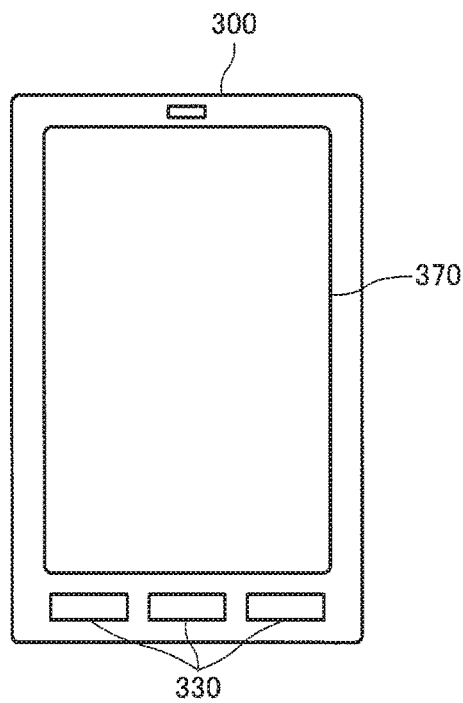
FIG. 9A is a diagram showing an example of an appearance of a smartphone as an example of the electronic apparatus 300.
Figure 9B:
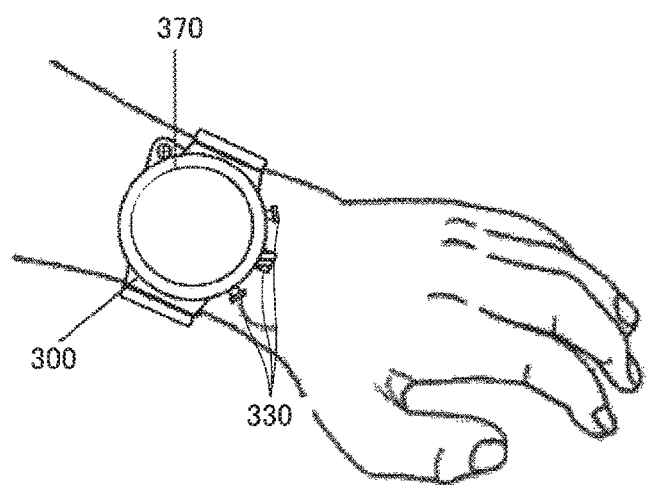
FIG. 9B is diagram showing an arm-mounted portable device as an example of the electronic apparatus 300.

FIG. 9A is a diagram showing an example of an appearance of a smartphone as an example of the electronic apparatus 300, and FIG. 9B shows an arm-mounted portable device as an example of the electronic apparatus 300. The smartphone as the electronic apparatus 300 shown in FIG. 9A is provided with buttons as the operation section 330, and an LCD as the display section 370. The portable device as the electronic apparatus 300 shown in FIG. 9B is provided with buttons and a stem as the operation section 330, and an LCD as the display section 370. Since these electronic apparatuses 300 is configured including the sensor device 1, the sensor device 1a, the sensor device 1b, or the sensor device 1c each capable of reducing the generation of the noise, the electronic apparatus 300 high in operation reliability can be realized.

3. Moving Object

Figure 10:
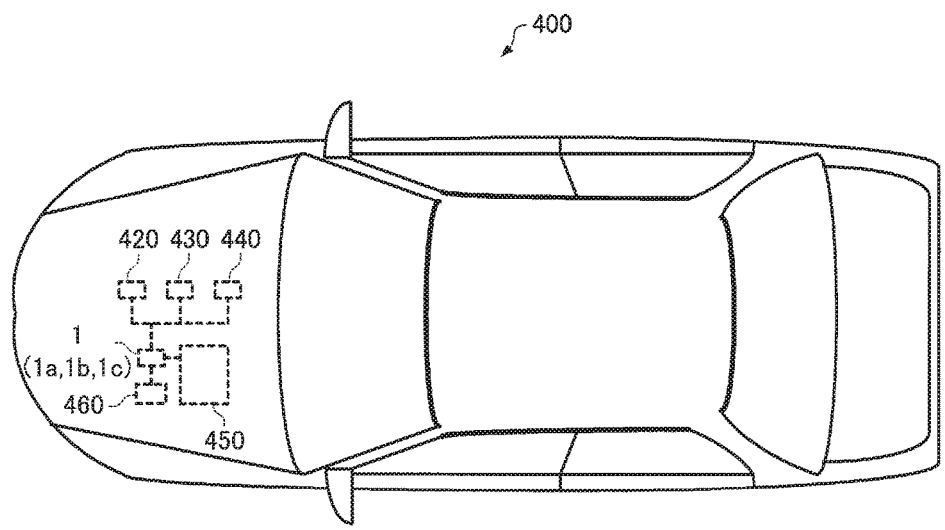
FIG. 10 is a diagram (a top view) showing an example of a moving object 400 according to the embodiment.

FIG. 10 is a diagram (a top view) showing an example of a moving object 400 according to the present embodiment. It should be noted that the constituents substantially the same as those of the embodiments described above are denoted with the same reference symbols, and the detailed description thereof will be omitted.

The moving object 400 according to the present embodiment is a moving object 400 including the sensor device 1, the sensor device 1a, the sensor device 1b, or the sensor device 1c. FIG. 10 shows the moving object 400 configured including the physical quantity detection device 200 configured including the sensor device 1. Further, in the example shown in FIG. 10, the moving object 400 is configured including controllers 420, 430, and 440 for performing control of a variety of systems such as an engine system, a brake system, and a keyless entry system, a battery 450, and a backup battery 460. It should be noted that the moving object 400 according to the present embodiment can also have a configuration obtained by eliminating or modifying some of the constituents (the sections) shown in FIG. 10, or adding another constituent.

According to the moving object 400 related to the present embodiment, since there is included the sensor device 1 capable of reducing the generation of the noise, the moving object 400 high in operation reliability can be realized. It should be noted that even in the case in which the moving object 400 is configured including the sensor device 1a, the sensor device 1b, or the sensor device 1c instead of the sensor device 1, substantially the same advantages can be obtained.

As such a moving object 400, a variety of types of moving objects can be adopted, and a vehicle (including an electric vehicle), an aircraft such a jet plane or a helicopter, a ship, a rocket, an artificial satellite, and so on can be cited.

Although the embodiments and the modified examples are explained hereinabove, the invention is not limited to the embodiments and the modified examples described above, but can be put into practice in various forms within the scope or the spirit of the invention.

The invention includes configurations (e.g., configurations having the same function, the same way, and the same result, or configurations having the same object and the same advantages) substantially the same as those explained in the description of the embodiments. Further, the invention includes configurations obtained by replacing a non-essential part of the configuration explained in the above description of the embodiments. Further, the invention includes configurations providing the same functions and the same advantage, or configurations capable of achieving the same object, as the configuration explained in the description of the embodiments. Further, the invention includes configurations obtained by adding a known technology to the configuration explained in the description of the embodiments.

The entire disclosure of Japanese Patent Application No: 2014-250942, filed Dec. 11, 2014 is expressly incorporated by reference herein.

What is claimed is:

1. A sensor device comprising:
a first physical quantity sensor;
a drive section adapted to generate a drive signal and drive the first physical quantity sensor with a drive frequency of the drive signal;
a second physical quantity sensor; and
an output section adapted to generate an output signal based on a signal from the second physical quantity sensor and a signal having a frequency n times as high as the drive frequency assuming n is an integer equal to or greater than 1, wherein
the signal having the frequency n times as high as the drive frequency is applied to the second physical quantity sensor.

2. The sensor device according to claim 1, wherein
the signal having the frequency n times as high as the drive frequency is a signal from the drive section.

3. The sensor device according to claim 2, further comprising:
a filter section, to which the signal from the drive section is input, and which has filter characteristics of transmitting a signal in a first band including the drive frequency, and attenuating a signal in a second band higher than the first band, wherein
the signal having the frequency n times as high as the drive frequency is a signal via the filter section.

4. The sensor device according to claim 3, further comprising:

a level-shift section adapted to decrease an amplitude of the signal from the drive section, wherein the signal having the frequency n times as high as the drive frequency is a signal from the level-shift section.

5. An electronic apparatus comprising:
the sensor device according to claim 4.

6. An electronic apparatus comprising:
the sensor device according to claim 3.

7. A moving object comprising:
the sensor device according to claim 3.

8. An electronic apparatus comprising:
the sensor device according to claim 2.

9. A moving object comprising:
the sensor device according to claim 2.

10. The sensor device according to claim 1, further comprising:
a waveform shaping section to which a signal from the drive section is input, wherein
the signal having the frequency n times as high as the drive frequency is a signal from the waveform shaping section.

11. The sensor device according to claim 10, further comprising:
a level-shift section adapted to decrease an amplitude of the signal from the drive section, wherein
the signal having the frequency n times as high as the drive frequency is a signal from the level-shift section.

12. An electronic apparatus comprising:
the sensor device according to claim 11.

13. The sensor device according to claim 10, wherein
the first physical quantity sensor is an angular velocity sensor, and
the second physical quantity sensor is an acceleration sensor.

14. An electronic apparatus comprising:
the sensor device according to claim 10.

15. The sensor device according to claim 1, further comprising:
a level-shift section adapted to decrease an amplitude of a signal from the drive section, wherein
the signal having the frequency n times as high as the drive frequency is a signal from the level-shift section.

16. The sensor device according to claim 15, wherein
the first physical quantity sensor is an angular velocity sensor, and
the second physical quantity sensor is an acceleration sensor.

17. An electronic apparatus comprising:
the sensor device according to claim 15.

18. The sensor device according to claim 1, wherein
the first physical quantity sensor is an angular velocity sensor, and
the second physical quantity sensor is an acceleration sensor.

19. An electronic apparatus comprising:
the sensor device according to claim 1.

20. A moving object comprising:
the sensor device according to claim 1.

* * * * *